United States Patent
Campomanes et al.

(10) Patent No.: US 9,517,507 B2
(45) Date of Patent: Dec. 13, 2016

(54) METHOD OF SHAPING GREEN PART AND MANUFACTURING METHOD USING SAME

(71) Applicant: Pratt & Whitney Canada Corp., Longueuil (CA)

(72) Inventors: Marc Campomanes, Longueuil (CA); Orlando Scalzo, Montreal (CA); Guillaume Poitras, Longueuil (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 297 days.

(21) Appl. No.: 14/333,954

(22) Filed: Jul. 17, 2014

(65) Prior Publication Data

US 2016/0016230 A1  Jan. 21, 2016

(51) Int. Cl.

| | |
|---|---|
| *B28B 11/00* | (2006.01) |
| *B22F 3/22* | (2006.01) |
| *B22F 5/00* | (2006.01) |
| *C04B 35/622* | (2006.01) |
| *B29C 35/02* | (2006.01) |
| *F23R 3/00* | (2006.01) |
| *C04B 35/638* | (2006.01) |
| *C04B 35/645* | (2006.01) |

(Continued)

(52) U.S. Cl.
CPC ............... *B22F 5/009* (2013.01); *B21D 11/00* (2013.01); *B22F 3/225* (2013.01); *B28B 11/005* (2013.01); *B29C 35/02* (2013.01); *C04B 35/638* (2013.01); *C04B 35/6455* (2013.01); *F01D 25/00* (2013.01); *F23R 3/002* (2013.01); *F23R 3/007* (2013.01); *B22F 2005/005* (2013.01); *B22F 2998/10* (2013.01); *B22F 2999/00* (2013.01); *B29L 2031/3076* (2013.01); *C04B 2235/6022* (2013.01); *C04B 2235/665* (2013.01); *F23R 2900/00018* (2013.01)

(58) Field of Classification Search
None
See application file for complete search history.

(56) References Cited

U.S. PATENT DOCUMENTS

| | | |
|---|---|---|
| 4,886,639 A | 12/1989 | Andrees et al. |
| 5,142,778 A | 9/1992 | Smolinski et al. |

(Continued)

FOREIGN PATENT DOCUMENTS

| | | |
|---|---|---|
| CA | 2643568 | 9/2007 |
| CA | 2588626 | 11/2008 |

(Continued)

OTHER PUBLICATIONS

T.Hong, W. Ju, M. Wu. "Rapid Prototyping of PMMA microfluidic chips utilizing a CO2 laser." Microfluid Nanofluid (2010) 9: 1125-1133.

(Continued)

*Primary Examiner* — Mary F Theisen
(74) *Attorney, Agent, or Firm* — Norton Rose Fulbright Canada

(57) ABSTRACT

A method of shaping a part in a green state obtained through powder injection molding, including placing a surface of the part in contact with a shaping surface of a setter with at least one section of the surface of the part not conforming to the shaping surface, and locally heating at least one area of each of the at least one section to deform the part until the at least one section conforms to the shaping surface. The part remains in the green state during the local heating. The part may be a heat shield panel for a gas turbine engine.

20 Claims, 6 Drawing Sheets

(51) Int. Cl.
  *B21D 11/00*  (2006.01)
  *F01D 25/00*  (2006.01)
  *B29L 31/30*  (2006.01)

(56) References Cited

U.S. PATENT DOCUMENTS

| | | | |
|---|---|---|---|
| 5,353,865 | A | 10/1994 | Adiutori et al. |
| 6,262,150 | B1 | 7/2001 | Behi et al. |
| 6,640,604 | B2 | 11/2003 | Matsushita |
| 6,935,022 | B2 | 8/2005 | German et al. |
| 7,246,993 | B2 | 7/2007 | Bolms et al. |
| 7,413,702 | B2 | 8/2008 | Lu et al. |
| 7,534,086 | B2 | 5/2009 | Mazzola et al. |
| 7,597,533 | B1 | 10/2009 | Liang |
| 7,726,936 | B2 | 6/2010 | Keller et al. |
| 8,316,541 | B2 | 11/2012 | Patel et al. |
| 8,596,963 | B1 | 12/2013 | Liang |
| 2002/0129925 | A1 | 9/2002 | Dixon et al. |
| 2005/0019199 | A1 | 1/2005 | Li et al. |
| 2008/0075619 | A1 | 3/2008 | Hosamani et al. |
| 2008/0213718 | A1 | 9/2008 | Abels et al. |
| 2008/0237403 | A1 | 10/2008 | Kelly et al. |
| 2009/0304497 | A1 | 12/2009 | Meier et al. |
| 2010/0236688 | A1 | 9/2010 | Scalzo et al. |
| 2011/0016717 | A1 | 1/2011 | Morrison et al. |
| 2012/0000072 | A9 | 1/2012 | Morrison et al. |
| 2012/0136400 | A1 | 5/2012 | Julien et al. |
| 2013/0031909 | A1 | 2/2013 | Patel et al. |
| 2013/0051979 | A1 | 2/2013 | Durocher et al. |
| 2013/0052007 | A1 | 2/2013 | Durocher et al. |
| 2013/0052074 | A1 | 2/2013 | Durocher et al. |
| 2013/0156626 | A1 | 6/2013 | Roth-Fagaraseanu et al. |
| 2013/0259732 | A1 | 10/2013 | Schult et al. |
| 2015/0093281 | A1 | 4/2015 | Campomanes et al. |

FOREIGN PATENT DOCUMENTS

| | | |
|---|---|---|
| DE | 102012206087 | 10/2013 |
| EP | 0538073 | 4/1993 |
| EP | 1033193 | 12/2004 |
| EP | 1876336 | 1/2008 |
| EP | 2230384 | 9/2010 |
| EP | 2372087 | 10/2011 |
| GB | 2448031 | 10/2008 |
| WO | 0245889 | 6/2002 |

OTHER PUBLICATIONS

Dearden G et al, Review Article, Some recent developments in two- and three-dimensional laser forming for 'macro' and 'micro' applications, Journal of optics A, pure and applied Optics, Institute of Physics publishing, Bristol, GB, vol. 5, No. 4, Jun. 25, 2003, pp. S8-S15.
U.S. Appl. No. 14/192,332, filed Feb. 27, 2014.
U.S. Appl. No. 14/656,342, filed Mar. 12, 2015.

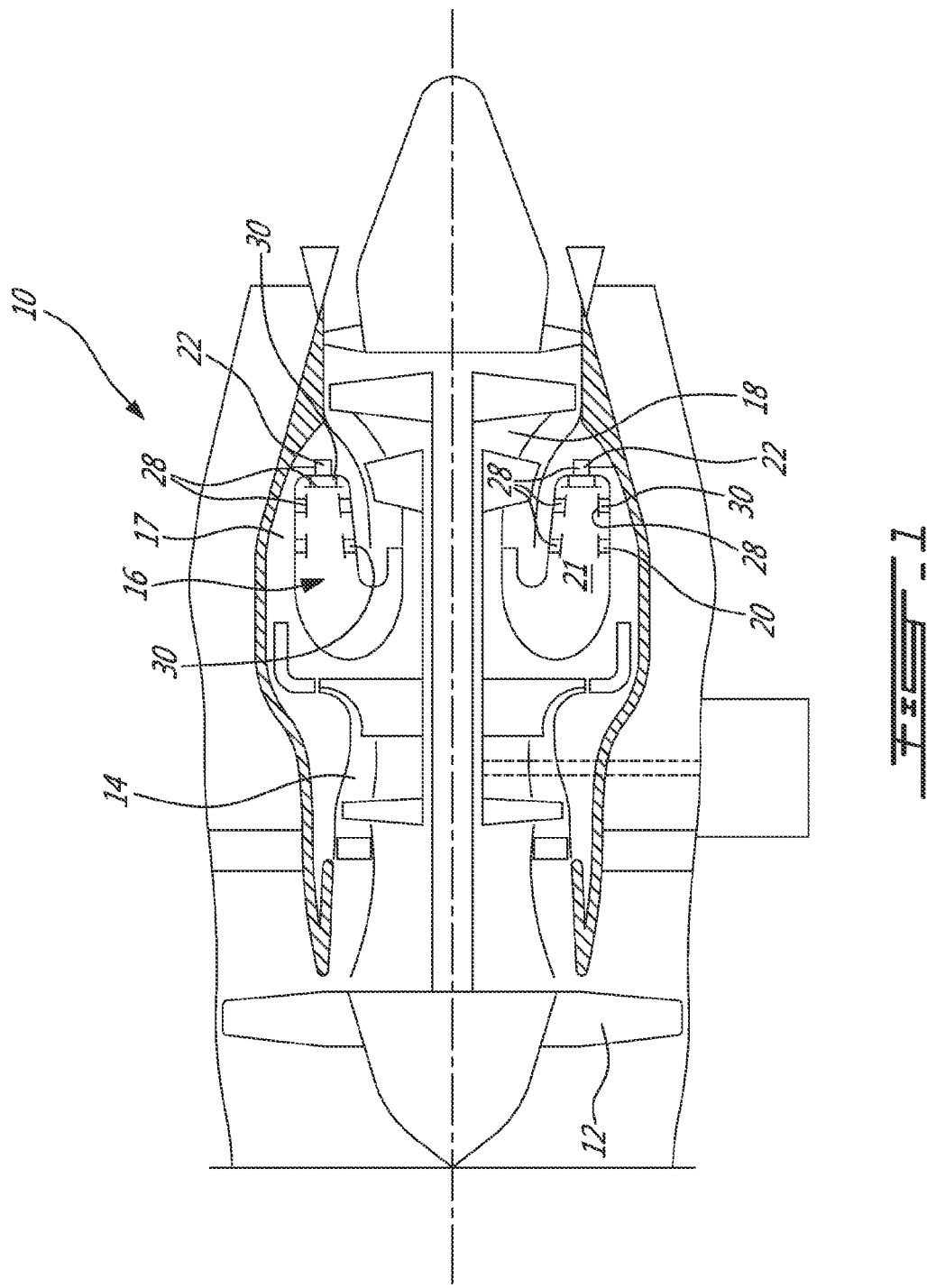

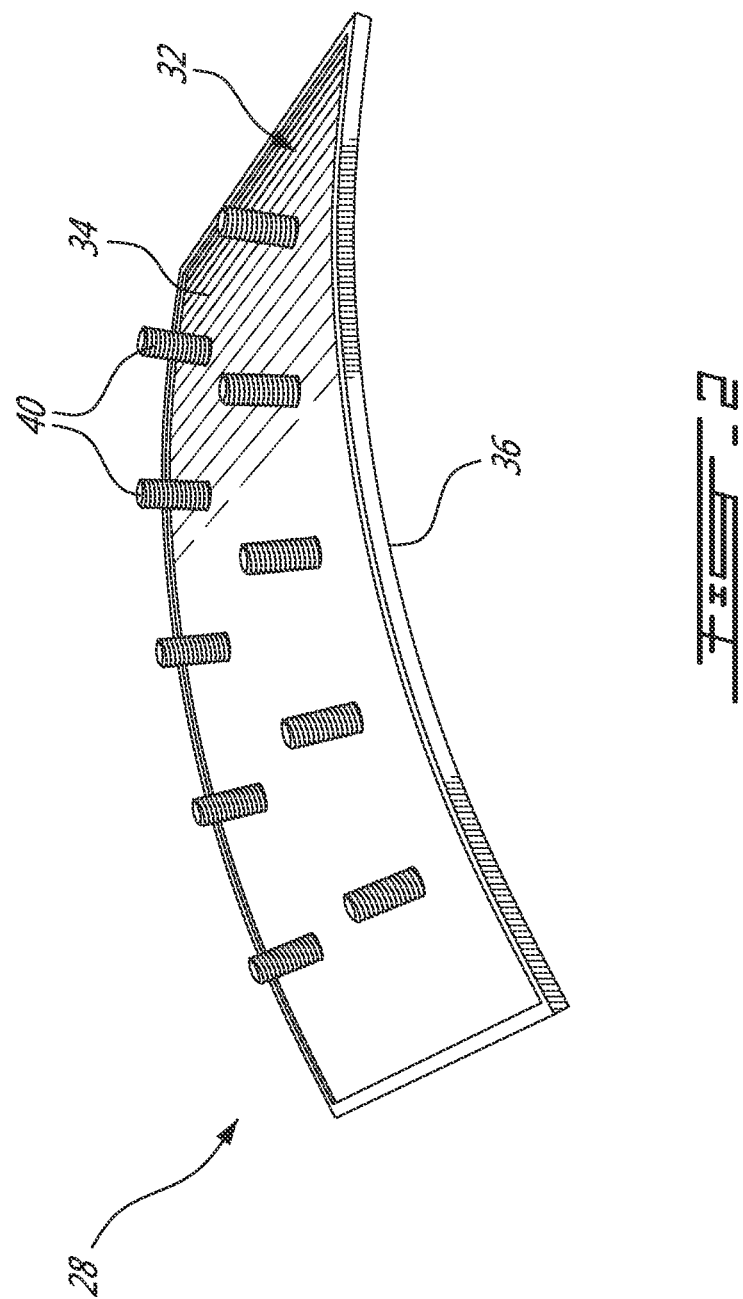

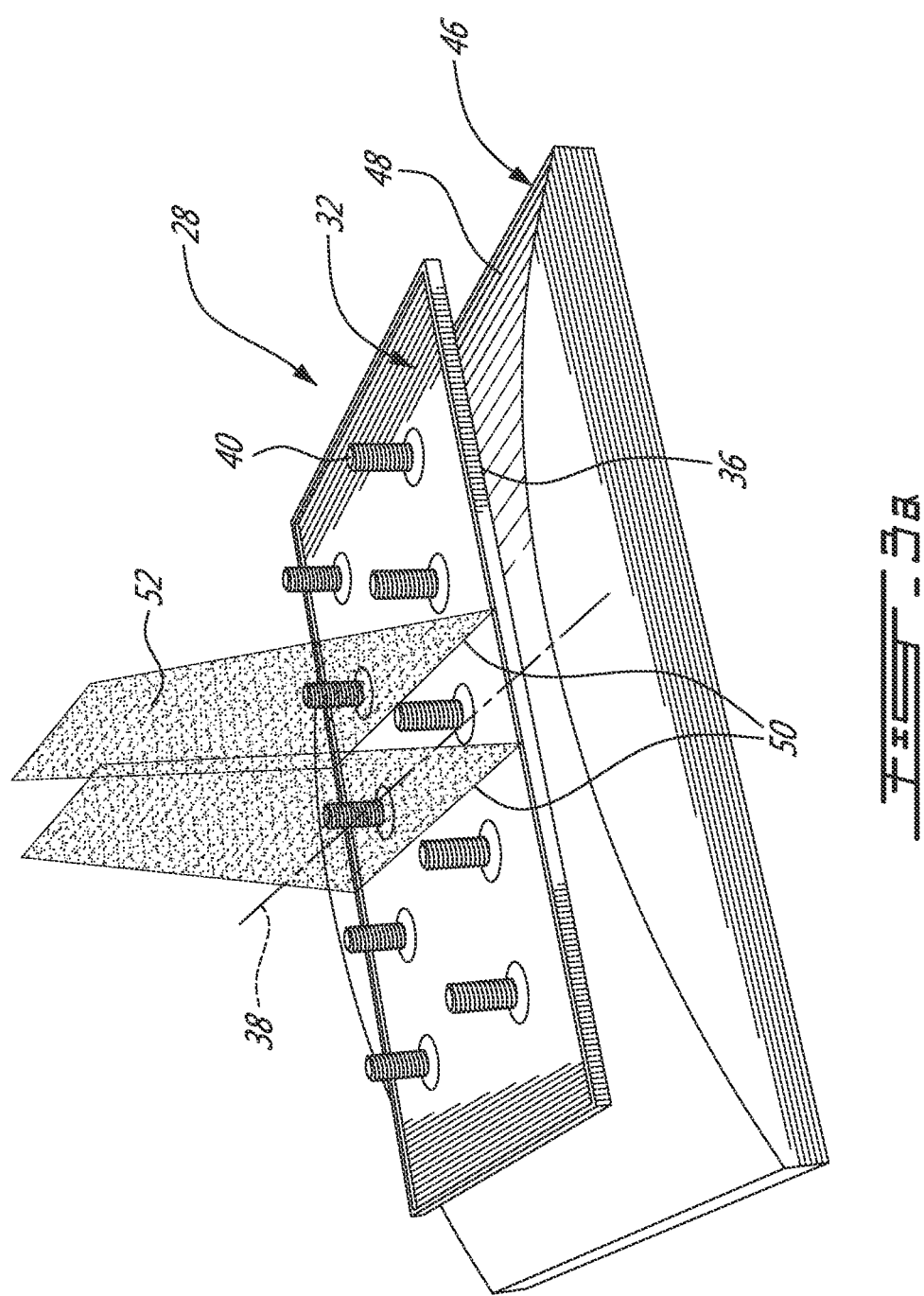

METHOD OF SHAPING GREEN PART AND MANUFACTURING METHOD USING SAME

TECHNICAL FIELD

The application relates generally to powder injection molding and, more particularly, to green part(s) obtained by powder injection molding.

BACKGROUND OF THE ART

Some gas turbine engine panel elements, such as for example some combustor heat shield panels, may have features which are relatively hard to mold. Such features may include, for example, a curved shape, angled retention members and/or angled cooling holes. Accordingly, manufacturing these elements using a molding process while being able to easily remove the element from the mold cavity may require the use of a mold with a complex configuration, which may render the use of a molding process such as powder injection molding to manufacture these elements undesirable and/or impractical.

SUMMARY

In one aspect, there is provided a method of manufacturing a heat shield panel for a gas turbine engine, the method comprising: molding the heat shield panel in a green state by powder injection molding, the heat shield panel having a platform section defining a reference surface; with the heat shield panel in the green state, placing the platform section on a setter with the reference surface against a shaping surface of the setter, the reference surface having an initial shape not conforming to the shaping surface; locally heating at least one area of the platform section to deform the platform section until the reference surface conforms to the shaping surface and has a final shape different from the initial shape, the at least one area of the heat shield panel remaining in the green state during the local heating; and debinding and sintering the heat shield panel after the reference surface has reached the final shape.

In another aspect, there is provided a method of manufacturing a panel element for a gas turbine engine, the method comprising: molding the panel element in a green state by powder injection molding, the panel element defining a reference surface and two elongated features each extending along a respective axis; with the panel element in the green state, placing the panel element on a setter with the reference surface against a shaping surface of the setter, the reference surface having an initial shape not conforming to the shaping surface; locally heating at least one area of the panel element spaced apart from the elongated features to deform the panel element until the reference surface conforms to the shaping surface and has a final shape different from the initial shape, an angle between the respective axes of the elongated features changing as the panel element deforms to reach a final desired angle once the reference surface conforms to the shaping surface, the at least one area of the panel element remaining in the green state during the local heating; and debinding and sintering the panel element after the reference surface has reached the final shape.

In a further aspect, there is provided a method of shaping a part in a green state obtained through powder injection molding, the method comprising: with the part in the green state, placing a surface of the part in contact with a shaping surface of the setter, at least one section of the surface of the part not conforming to the shaping surface; and locally heating at least one area of each of the at least one section to deform the part until the at least one section conforms to the shaping surface, the part remaining in the green state during the local heating.

DESCRIPTION OF THE DRAWINGS

Reference is now made to the accompanying figures in which:

FIG. 1 is a schematic cross-sectional view of a gas turbine engine;

FIG. 2 is a schematic tridimensional view of a heat shield panel in accordance with a particular embodiment, which may be used in a gas turbine engine such as shown in FIG. 1;

FIGS. 3a-3b are schematic tridimensional and side views of the heat shield panel of FIG. 2 during one step of its manufacturing process, in accordance with a particular embodiment;

DETAILED DESCRIPTION

Figure 3B:
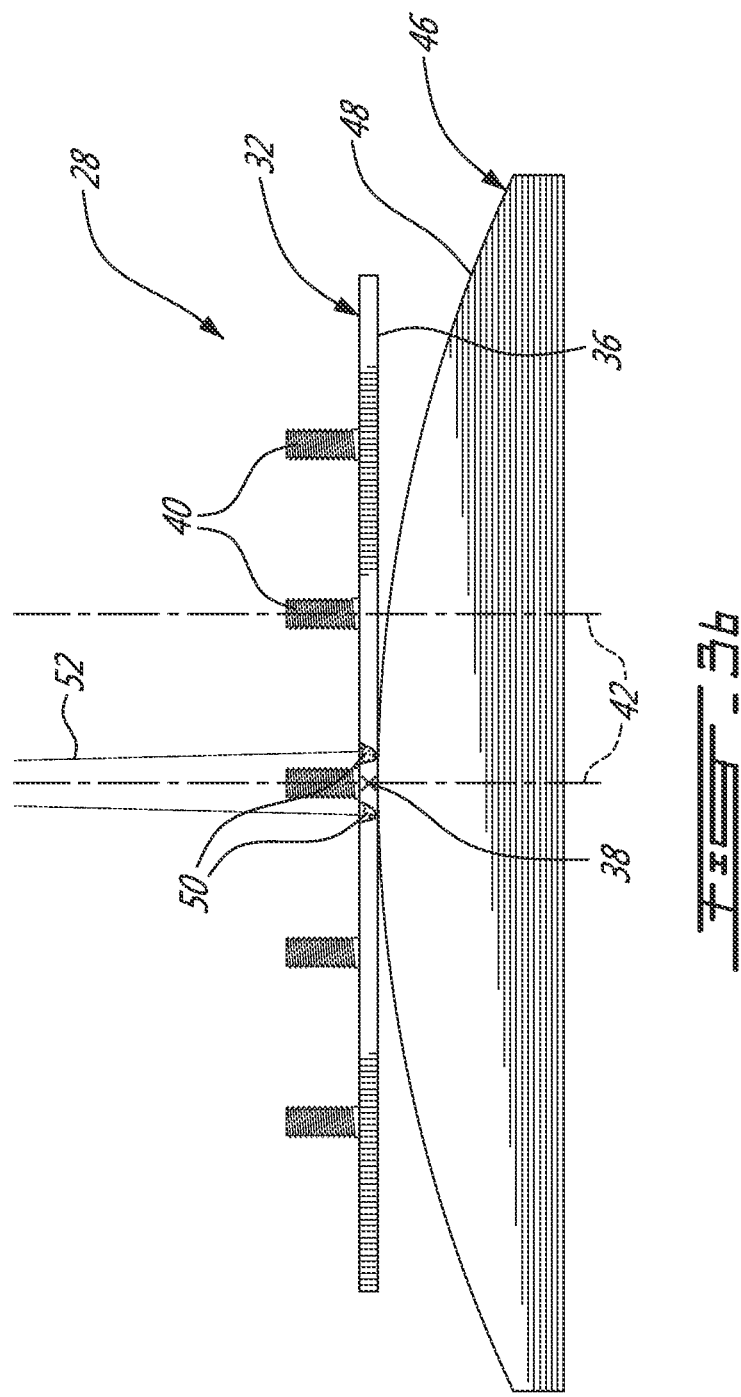

FIG. 1 illustrates a gas turbine engine 10 of a type preferably provided for use in subsonic flight, generally comprising in serial flow communication a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases.

The combustor 16 is housed in a plenum 17 supplied with compressed air from compressor section 14. The combustor 16 typically comprises a combustor shell 20 defining a combustion chamber 21 and a plurality of fuel nozzles (only two being shown at 22), which are typically equally circumferentially distributed on the dome end panel of the combustor shell 20 in order to permit a substantially uniform temperature distribution in the combustion chamber 21 to be maintained. The combustor shell 20 is typically made out from sheet metal. In use, fuel provided by a fuel manifold (not shown) is atomized by the fuel nozzles 22 into the combustion chamber 21 for ignition therein, and the expanding gases caused by the fuel ignition drive the turbine 18 in a manner well known in the art.

Annular rows of circumferentially segmented heat shield panels 28 are mounted to the inner surface of the combustor shell 20 to thermally shield the same. Each row of heat shield panels 28 may cover the full circumference of the combustor shell 20. As shown in FIG. 1, some of the heat shield panels 28 may be mounted to the dome panel of the combustor shell 20 and others to the axially projecting portions of the combustor shell 20. Depending on the intended application, the heat shield panels 28 may fully cover the inner surface of the combustor shell 20 from the dome end to the opposed discharged end of the combustor. Alternatively, the heat shield panels may be only provided on specific portions, such as the dome end wall, of the combustor shell 20.

The heat shield panels 28 have cold side surfaces or back surfaces which are spaced from the inner surface of the combustor shell 20 to define a back cooling space 30 such that cooling air may circulate therethrough to cool the heat shield panels 28. Holes are typically defined in the combustor shell 20 to allow cooling air to flow from the plenum 17 to the back cooling space 30 between the heat shield panels 28 and the combustor shell 20.

FIG. 2 shows an exemplary construction of one of the combustor heat shield panels 28. The heat shield panel 28 has a platform section 32 having opposed cold and hot facing sides 34 and 36, and cold side details extending from the cold facing side 34 of the platform section 32. Although not shown, the cold side details may include various types of elongated features such as heat exchange promoting structures, rails, bosses, divider walls, ribs, pin fins, etc. According to the illustrated embodiment, the cold side details include retaining elements in the form of threaded studs 40. The threaded studs 40 are used to retain the heat shield panel 28 in place, and in a particular embodiment protrude through holes defined in the combustor shell 20 and are threadingly engaged to fastening elements, such as for example self-locking nuts, from outside of the combustor shell 20. Other types of retaining elements may alternately be used.

A thermal barrier coating, such as a ceramic coating (TBC), may be applied to the hot facing side 36 of the platform section 32. Holes, such as effusion holes and dilution holes (not shown), may be defined through the platform section 32. The effusion holes allow the cooling air to flow from the back cooling space 30 to the front or hot facing side 36 of the heat shield panels 28.

In the embodiment shown, both the cold and hot facing sides 34 and 36 have a curved shape, more particularly an arcuate shape corresponding to an arcuate portion of a cylinder. Other types of curved shapes can also be used depending on the configuration of the surface to be protected by the heat shield panel 28, including, but not limited to, a shape corresponding to part of a cone, a sphere, or a toroid.

The heat shield panel 28 is manufactured by powder injection molding from a an appropriate type of powder injection molding feedstock. Such a feedstock can include high temperature resistant powder metal alloys (metal injection molding), such as a nickel superalloy, or ceramic powders or mixtures thereof, mixed with an appropriate binder. Other high temperature resistant material powders which may include one material or a mix of materials could be used as well. The feedstock is a mixture of the material powder and of a binder which may include one or more binding material(s). In a particular embodiment, the binder includes an organic material which is molten above room temperature (20° C.) but solid or substantially solid at room temperature. The binder may include various components such as surfactants which are known to assist the injection of the feedstock into mold for production of the green part. In a particular embodiment, the binder includes a mixture of binding materials, for example including a lower melting temperature polymer, such as a polymer having a melting temperature below 100° C. (e.g. paraffin wax, polyethylene glycol, microcrystalline wax) and a higher melting temperature polymer or polymers, such as a polymer or polymers having a melting temperature above 100° C. (e.g. polypropylene, polyethylene, polystyrene, polyvinyl chloride).

The heat shield panel 28 is molded such as to have in its green state (i.e. molded part produced by the solidified binder that holds the injection powder together) an initial shape which is different from its final desired shape. The initial shape is selected such as to be able to reach the final shape through deformation, and such as to be easier to mold than the final shape, i.e. the initial shape corresponds to a mold cavity and mold configuration having a reduced degree of complexity with respect to that which would be required to mold the heat shield panel 28 directly in its final shape. In a particular embodiment and as shown in FIGS. 3*a*-3*b*, the heat shield panel 28 is molded with its platform section 32 having a planar configuration and with the studs 40 extending perpendicularly with respect to the planar platform section 32. The studs 40 thus each extend along a respective axis 42 (FIG. 3*b*), with the axes 42 being parallel to one another when the heat shield panel 28 in its initial (just molded) shape.

Still referring to FIGS. 3*a*-3*b*, the heat shield panel 28 in the green state is placed against a setter 46. The heat shield panel 28 includes a reference surface, defined in the example shown by the hot facing side 36, which is put into contact with a shaping surface 48 of the setter 46. The reference surface 36 has an initial shape which does not conform to the shaping surface 48. The shaping surface 48 corresponds to the final shape which is desired for the reference surface 36.

One or more areas 50 of the platform section 32 are then locally heated such as to deform the platform section 32 until the reference surface 36 conforms to the shaping surface 48 such as to obtain the desired final shape. In a particular embodiment, the areas 50 are selected such as avoid heating of the studs 40. The temperature of the locally heated areas 50 is selected such that the areas 50, as well as the rest of the heat shield panel 28, remain in the green state during the local heating; accordingly, the temperature of the locally heated areas 50 is lower than the vaporization temperature of the binder to avoid debinding, and also lower than the sintering temperature of the powder material to avoid sintering. In a particular embodiment the areas 50 are heated to a temperature above the melting temperature of one or more polymer(s) present in the binder but below the melting temperature of one or more other polymer(s) in the binder, such as to melt only some of the components of the binder. Accordingly, the higher melting temperature polymer(s) in the binder remain in their solid state. In another embodiment, the areas 50 are heated to a temperature lower than the melting temperature of all the components of the binder, but high enough to produce some softening of the binder and allow for the deformation to occur.

Figure 4:
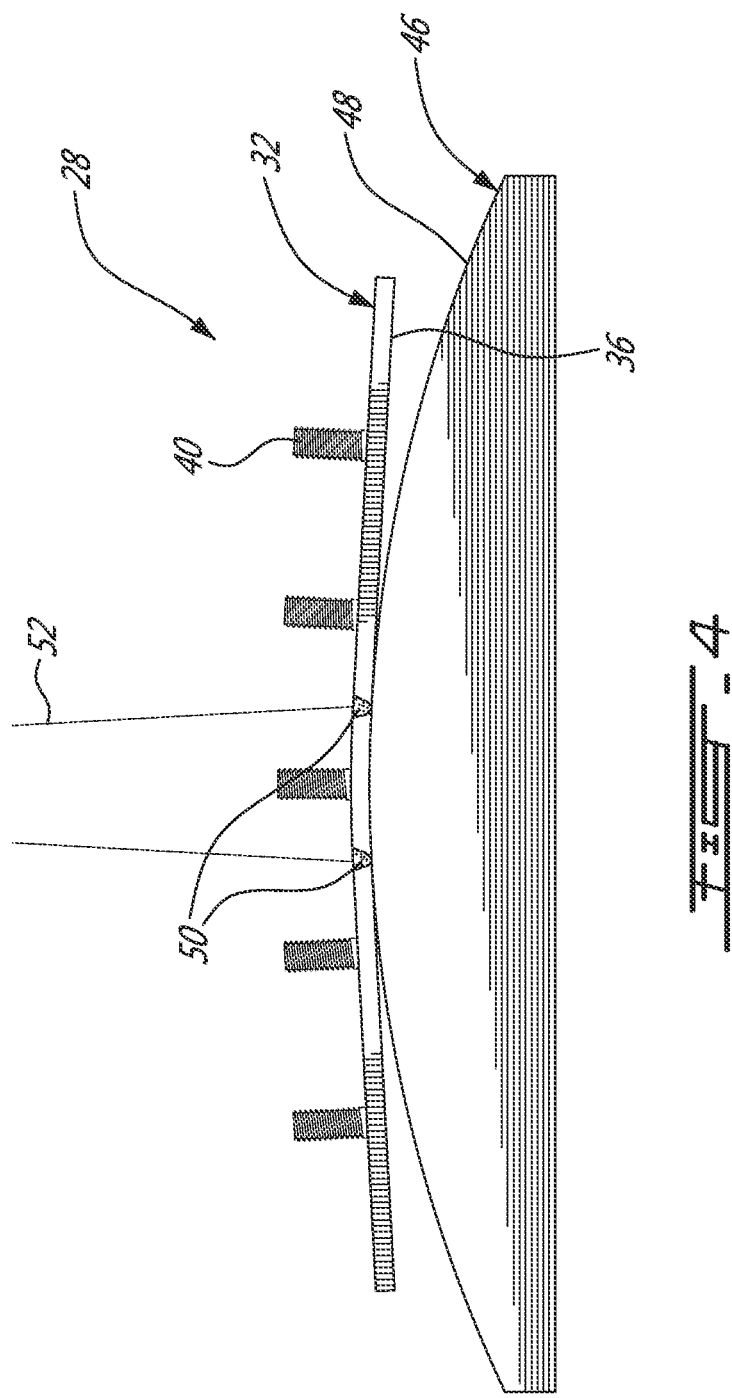
FIG. 4 is a schematic side view of the heat shield panel of FIG. 2 during a subsequent step of its manufacturing process, in accordance with a particular embodiment.
Figure 5:
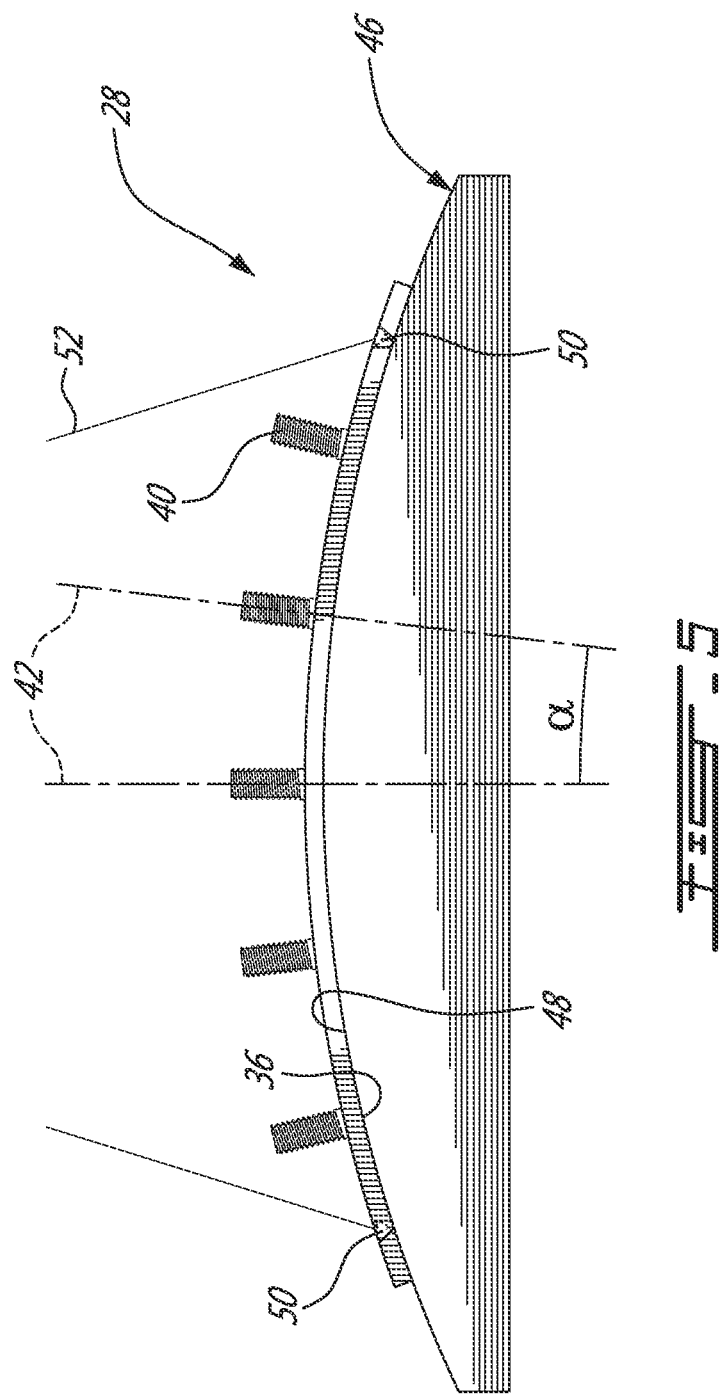
FIG. 5 is a schematic side view of the heat shield panel of FIG. 2 during another subsequent step of its manufacturing process, in accordance with a particular embodiment.

In a particular embodiment, a plurality of areas 50 are heated locally and sequentially to produce the deformation of the platform section 32. In the embodiment shown in FIGS. 3*a*-3*b*, the reference surface 36 contacts the shaping surface 48 along a central axis 38 of the platform section 32, and the platform section 32 is first locally heated along two areas 50 defined as parallel lines extending on each side, parallel to and in proximity of the central axis 38. The distance between the two heated lines is progressively increased to define the other heated areas 50 as the platform section 32 deforms, as shown in FIGS. 4-5. The platform section 32 is thus progressively deformed such that each heated area 50 sequentially conforms to the shaping surface 48. Although only 3 pairs of parallel line areas 50 are shown, it is understood that the platform section 32 may be locally and sequentially heated along more areas. The locally heated areas 50 may be spaced apart from one another, with a minimum spacing between the areas 50 being selected to obtain an acceptable form for the platform section 32. In another particular embodiment, the sequentially heated areas together define an entirety of the surface of the platform section 32, i.e. the sequentially heated areas 50 abut one another.

In the embodiment shown, the area(s) 50 are locally heated using a laser beam 52, which is defocussed and/or moved (e.g. wobbled) to limit the temperature increase of the area(s) 50. In a particular embodiment, the sequentially heated areas 50 abut one another but the lines of material on which the laser is directly applied are spaced apart from one another, i.e. the laser parameters are selected such that each locally heated area 50 extends beyond the portion of material directly contacted by the laser beam. In another particular embodiment, the laser beam is sequentially applied to the entirety of the surface of the platform section 32. Alternate local heating tools may be used, including, but not limited to, a heat gun and/or white light.

In a particular embodiment, the deformation of the platform section 32 after the local heating of the selected areas 50 is obtained solely through gravity. In an alternate embodiment, a force is applied against the platform section 32 towards the shaping surface 48 during and/or after the local heating of the selected areas 50 to deform the platform section 32 until the reference surface 36 conforms to the shaping surface 48. In a particular embodiment, the force is applied by adding one or more weight(s) on the platform section 32.

In a particular embodiment, the shaping surface 48 does not correspond to the desired shape of the platform section 32 of the finished panel 28, but to an intermediary shape; the deformed platform section 32 is then placed against another shaping surface (e.g. with a higher radius) and the process is repeated until the reference surface 36 conforms to this new shaping surface. Such an iterative process may be used when deformation directly to the desired shape of the finished panel 28 may be too great to avoid breaking and/or distortion of the part. More than one intermediate shapes may be used. The intermediate shape(s) may have different configurations from the final shape, e.g. intermediate shape with curve in one plane and final shape with compound curve.

From FIGS. 3-5, it can be seen that the deformation of the platform section 32 changes the relative orientation of the studs 40; the angle between the respective stud axes 42 changes as the platform section 32 deforms to reach the final desired angle α (i.e. the angle desired in the final shape of the part) once the reference surface 36 conforms to the shaping surface 48. Accordingly, the studs 40 may be molded as extending parallel to each other and have an angled orientation with respect to one another once the heat shield panel 28 reaches its final shape. In a particular embodiment, this allows for the use of mold cavities and mold structures having a simpler shape, which may be easier and/or less expensive to configure. In a particular embodiment, the platform section 32 is deformed to create an undercut or cavity not defined during the molding of the platform section 32, thus avoiding the use of a sacrificial element or other insert in the mold.

Although the method has been described as applied to the heat shield panel 28, it is understood that a similar method may be applied to any appropriate type of panel element, including but not limited to arcuate shroud plates in a gas turbine engine, and folded brackets having a configuration which may be otherwise obtained through sheet metal folding, and any other suitable part, including gas turbine engine parts and parts for other applications. Appropriate types of panel elements may include elongated features such as, but not limited to, attachment members, pins, fins, rails, ribs, walls, bosses, etc. extending therefrom and/or cooling holes or other apertures defined therein or therethrough, which may be molded as extending at an initial angle with respect to one another, and which may reach an orientation defined by a second angle, different from the first angle, with respect to one another through the deformation of the panel element. Preferably, the elongated features are easier to mold with the relative orientation defined by the first angle than with the relative orientation defined by the second angle. It is understood that the method may also be applied to deform a panel element that does not include such elongated features and/or to any other appropriate type of part.

Although the heat shield panel 28 has been shown with the platform section 32 being molded in a planar configuration, it is understood that in another embodiment, the heat shield panel 28 or other panel element may be molded with a curved configuration different from the final desired shape, and deformed to the final desired shape as described above.

It is understood that the method may also be used to deform only a portion of a part, i.e. the part may be molded with one or more first portion(s) thereof already in its/their final shape and with one or more second portion(s) thereof in a shape different from the final shape, the second portion(s) being deformed as described above to reach its/their final shape without deforming the first portion(s).

In a particular embodiment, the section of the panel element or part being deformed (e.g. platform section 32 in the case of the heat shield panel 28) has a thickness of 0.1 inch or less, and in another particular embodiment a thickness of 0.05 inch or less; and/or has a constant thickness across the section being deformed. In a particular embodiment, a constant thickness may allow for a better prediction of the deformation behaviour of the section being deformed and/or may allow for sections having a greater thickness to be successfully deformed. In a particular embodiment, a smaller thickness may reduce the risks of distortion during the deformation.

Once the green part, e.g. heat shield panel 28, is shaped, it is submitted to a debinding operation to remove most or all of the binder. The green part can be debound using various debinding solutions and/or heat treatments known in the art, to obtain a brown part. After the debinding operations, the brown part is sintered. The sintering operation can be done in an inert gas environment, a reducing atmosphere ($H_2$ for example), or a vacuum environment depending on the composition of material to be obtained. In a particular embodiment, sintering is followed by a heat treatment also defined by the requirements of the material of the finished part. In some cases, it may be followed with hot isostatic pressing (HIP). Coining may also be performed to further refine the profile of the part. It is understood that the parameters of the sintering operation can vary depending on the composition of the feedstock, on the method of debinding and on the configuration of the part.

The above description is meant to be exemplary only, and one skilled in the art will recognize that changes may be made to the embodiments described without departing from the scope of the invention disclosed. Modifications other than those specifically described above which fall within the scope of the present invention will be apparent to those skilled in the art, in light of a review of this disclosure, and such modifications are intended to fall within the appended claims.

The invention claimed is:
1. A method of manufacturing a heat shield panel for a gas turbine engine, the method comprising:
   molding the heat shield panel in a green state by powder injection molding, the heat shield panel having a platform section defining a reference surface;
   with the heat shield panel in the green state, placing the platform section on a setter with the reference surface against a shaping surface of the setter, the reference surface having an initial shape not conforming to the shaping surface;

locally heating at least one area of the platform section to deform the platform section until the reference surface conforms to the shaping surface and has a final shape different from the initial shape, the at least one area of the heat shield panel remaining in the green state during the local heating; and debinding and sintering the heat shield panel after the reference surface has reached the final shape.

2. The method as defined in claim 1, wherein the at least one area is heated to melt only some components of a binder of the heat shield panel in the at least one area, the other components of the binder in the at least one area remaining solid.

3. The method as defined in claim 1, wherein the at least one area includes a plurality of areas which are heated sequentially as the platform section deforms.

4. The method as defined in claim 1, wherein the at least one area is heated using an unfocussed and/or moving laser beam.

5. The method as defined in claim 1, further including applying a force against the platform section towards the shaping surface to deform the platform section until the reference surface conforms to the shaping surface.

6. The method as defined in claim 1, wherein molding the heat shield panel includes molding attachment members extending from a surface of the platform section opposed from the reference surface, and deforming the platform section changes a relative orientation of at least some of the attachment members.

7. The method as defined in claim 1, wherein the initial shape of the reference surface is planar.

8. The method as defined in claim 7 wherein the final shape of the reference surface defines part of a cylinder.

9. A method of manufacturing a panel element for a gas turbine engine, the method comprising:

molding the panel element in a green state by powder injection molding, the panel element defining a reference surface and two elongated features each extending along a respective axis;

with the panel element in the green state, placing the panel element on a setter with the reference surface against a shaping surface of the setter, the reference surface having an initial shape not conforming to the shaping surface;

locally heating at least one area of the panel element spaced apart from the elongated features to deform the panel element until the reference surface conforms to the shaping surface and has a final shape different from the initial shape, an angle between the respective axes of the elongated features changing as the panel element deforms to reach a final desired angle once the reference surface conforms to the shaping surface, the at least one area of the panel element remaining in the green state during the local heating; and debinding and sintering the panel element after the reference surface has reached the final shape.

10. The method as defined in claim 9, wherein the at least one area is heated to melt only some components of a binder of the panel element in the at least one area, the other components of the binder in the at least one area remaining solid.

11. The method as defined in claim 9, wherein the at least one area includes a plurality of areas which are heated sequentially as the panel element deforms.

12. The method as defined in claim 9, wherein the at least one area is heated using an unfocussed and/or moving laser beam.

13. The method as defined in claim 9, further including applying a force against the panel element towards the shaping surface to deform the panel element until the reference surface conforms to the shaping surface.

14. The method as defined in claim 9, wherein the elongated features include threaded members extending from a surface of the panel element opposed from the reference surface.

15. The method as defined in claim 9, wherein the initial shape of the reference surface is planar.

16. The method as defined in claim 15, wherein the final shape of the reference surface defines part of a cylinder.

17. A method of shaping a part in a green state obtained through powder injection molding, the method comprising:

with the part in the green state, placing a surface of the part in contact with a shaping surface of a setter, at least one section of the surface of the part not conforming to the shaping surface; and locally heating at least one area of each of the at least one section to deform the part until the at least one section conforms to the shaping surface, the part remaining in the green state during the local heating.

18. The method as defined in claim 17, wherein the at least one area is heated to melt only some components of a binder of the part in the at least one area, the other components of the binder in the at least one area remaining solid.

19. The method as defined in claim 17, wherein the at least one area includes a plurality of areas which are heated sequentially as the part deforms.

20. The method as defined in claim 17, further including applying a force against the part towards the shaping surface to deform the part until the at least one section of the surface conforms to the shaping surface.

* * * * *